(12) United States Patent
Lee

(10) Patent No.: US 12,305,359 B2
(45) Date of Patent: May 20, 2025

(54) HYDRAULIC BREAKER PROVIDED WITH AUTOMATIC LUBRICANT SUPPLY STRUCTURE

(71) Applicant: SOOSAN HEAVY INDUSTRIES CO., LTD., Hwaseong (KR)

(72) Inventor: Sang Woo Lee, Osan (KR)

(73) Assignee: SOOSAN HEAVY INDUSTRIES CO., LTD., Hwaseong (KR)

( * ) Notice: Subject to any disclaimer, the term of this patent is extended or adjusted under 35 U.S.C. 154(b) by 803 days.

(21) Appl. No.: 16/975,075

(22) PCT Filed: May 29, 2018

(86) PCT No.: PCT/KR2018/006103
§ 371 (c)(1),
(2) Date: Aug. 21, 2020

(87) PCT Pub. No.: WO2019/221321
PCT Pub. Date: Nov. 21, 2019

(65) Prior Publication Data
US 2021/0087786 A1    Mar. 25, 2021

(30) Foreign Application Priority Data

May 18, 2018 (KR) .......................... 10-2018-0057031

(51) Int. Cl.
*E02F 3/96*    (2006.01)
*B25D 17/26*    (2006.01)
(Continued)

(52) U.S. Cl.
CPC .............. *E02F 3/966* (2013.01); *B25D 17/26* (2013.01); *F16N 13/16* (2013.01);
(Continued)

(58) Field of Classification Search
CPC .......... F16N 13/16; E02F 3/966; B25D 17/26; B25D 2250/121
See application file for complete search history.

(56) References Cited

U.S. PATENT DOCUMENTS 1,434,694 A * 11/1922 Gilman .................. B25D 17/26
173/78
6,145,625 A * 11/2000 Prokop ................... F16N 11/10
417/489

(Continued)

FOREIGN PATENT DOCUMENTS

EP      0 430 024 A1   6/1991
KR      20040021008 A * 3/2004 .............. E02F 3/966
(Continued)

OTHER PUBLICATIONS

The Extended European Search Report for European Patent Application No. 18918924.4, dated Jan. 20, 2022.
(Continued)

*Primary Examiner* — Minh Truong

(57) ABSTRACT

A hydraulic breaker provided with an automatic lubricant supply structure is proposed. The automatic lubricant supply structure is configured to automatically supply a lubricant without a separate hose, using a working fluid, and is disposed in the body of the hydraulic breaker, and can be used without a separate external part.

7 Claims, 12 Drawing Sheets

(51) Int. Cl.
*F16N 13/16* (2006.01)
*E02F 9/22* (2006.01)

(52) U.S. Cl.
CPC .... *B25D 2222/72* (2013.01); *B25D 2250/121* (2013.01); *E02F 9/2221* (2013.01); *E02F 9/2267* (2013.01)

(56) References Cited

U.S. PATENT DOCUMENTS

| | | | | |
|---|---|---|---|---|
| 10,682,748 | B2* | 6/2020 | Moore | F16N 7/36 |
| 2006/0243528 | A1* | 11/2006 | Bukhari | F16N 7/36 |
| | | | | 184/27.1 |
| 2007/0187181 | A1* | 8/2007 | Brendel | F16N 13/06 |
| | | | | 184/6.28 |
| 2012/0043163 | A1* | 2/2012 | Jagdale | B25D 17/26 |
| | | | | 184/6.14 |
| 2013/0240299 | A1 | 9/2013 | Jagdale | |
| 2014/0144659 | A1* | 5/2014 | Nickels | E02F 3/966 |
| | | | | 173/90 |
| 2014/0332244 | A1* | 11/2014 | Moore | E02F 3/966 |
| | | | | 173/90 |
| 2016/0046009 | A1 | 2/2016 | Moore | |
| 2017/0028541 | A1 | 2/2017 | Moore | |
| 2017/0274516 | A1 | 9/2017 | Jeon | |

FOREIGN PATENT DOCUMENTS

| | | |
|---|---|---|
| KR | 1020040021008 A | 3/2004 |
| KR | 200369452 Y1 * | 12/2004 |
| KR | 100468942 B1 | 1/2005 |
| KR | 10-0674430 B1 | 1/2007 |
| KR | 100831416 B1 | 5/2008 |
| KR | 100908218 B1 | 7/2009 |
| KR | 101797659 B1 | 11/2017 |

OTHER PUBLICATIONS

Search Report for International Application No. PCT/KR2018/006103, dated Feb. 18, 2019.

* cited by examiner

HYDRAULIC BREAKER PROVIDED WITH AUTOMATIC LUBRICANT SUPPLY STRUCTURE

TECHNICAL FIELD

The present invention relates to a hydraulic breaker and, more particularly, to a hydraulic breaker provided with an automatic lubricant supply structure.

BACKGROUND ART

In general, a hydraulic breaker is an apparatus that is mounted on construction equipment such as an excavator and breaks an object such as a rock and concrete using a hitting force that is generated by moving up/down a piston that is an ascending/descending member using power such as hydraulic pressure.

According to hydraulic breakers of the related art, a worker has to periodically directly inject a lubricant to prevent a chisel that is hit by a piston moving up/down from being worn due to friction, so there is a problem that the work efficiency decreases. Further, since a worker must periodically directly inject a lubricant, as described above, when the timing to inject a lubricant is missed, a supporting portion is severely worn, which causes reduction of lifespan of the piston and the chisel and severe damage to the hydraulic breakers.

In order to solve these problems, hydraulic breakers that automatically supply a lubricant have been developed, and such hydraulic breakers have been disclosed in Korean Patent No. 10-0908218 (hereafter, referred to as a 'patent document 1') and Korean Patent No. 10-0468942 (hereafter, referred to as 'patent document 2').

First, the patent document 1 proposes a hydraulic breaker that automatically supplies a lubricant, in which an automatic lubricant supply apparatus is integrated with the hydraulic breaker.

According to the hydraulic breaker of the patent document 1, a ball blocks a supply channel when the hydraulic breaker is not operated, so a lubricant is not discharged even though a pressure plate presses the lubricant in a lubricant chamber. Further, when the hydraulic breaker is operated, a chisel applies a reacting force to a piston and the reacting force applied to the piston is transmitted to the lubricant chamber and presses the pressing plate together with an elastic force of an elastic member in the lubricant chamber, so the ball blocking the supply channel is pushed up and the lubricant is supplied into a front head through the supply channel.

As described above, according to the hydraulic breaker of the patent document 1, since the supply channel is opened and the lubricant is supplied every time the piston hits the chisel, the lubricant is automatically supplied.

However, according to the patent document 1, when the chisel is hit, elasticity is generated in the elastic member due to vibration, etc., and accordingly the lubricant is supplied. Therefore, if vibration is generated even though the hydraulic breaker is not operated (e.g., when the hydraulic breaker is carried by a truck, etc.), malfunction such as supply of the lubricant may occur in the lubricant supply mechanism.

The patent document 2 proposes an automatic lubricator that is separately attached to the body of a breaker.

The automatic lubricator of the patent document 2 is separately attached to a side of a body and a grease cartridge filled with grease is detachably coupled to the automatic lubricator.

Further, the automatic lubricator has a hydraulic pressure entrance that is connected to a hydraulic line of an excavator, so when high hydraulic pressure is supplied into the automatic lubricator through the hydraulic pressure entrance, a valve opens and the grease in the grease cartridge is supplied to a breaker through a grease outlet.

According to the patent document 2, unlike the patent document 1, since grease is automatically supplied by high hydraulic pressure, it is possible to solve the problem of malfunction in the patent document 1.

However, according to the patent document 2, since the automatic lubricator is attached to a breaker as a separate part, the automatic lubricator is exposed to the outside. Accordingly, there are problems that 1) the automatic lubricator may be broken by fragments of a rock when the rock is broken and 2) the size of a breaker increases, so it may not be easily mounted on an excavator.

Further, since the hydraulic pressure entrance and the hydraulic line of an excavator are connected through a hose, the hose structure becomes very complicated when the hydraulic lubricator is mounted on a breaker. This is because since a breaker has an intake line through which a working fluid flows into the breaker and a discharge line through which a working fluid is discharged from the breaker to an excavator, when a separate hose is added, at least three hoses are required.

RELATED ART DOCUMENT

Patent Document (Patent Document 1) Korean Patent No. 10-0908218
(Patent Document 2) Korean Patent No. 10-0468942

DISCLOSURE

Technical Problem

The present invention has been made in an effort to solve the problems described above and an objective of the present invention is to provide a hydraulic breaker provided with an automatic lubricant supply structure that automatically supplies a lubricant without a separate hose using a working fluid and can be used without a separate external part because it is installed in the body of the hydraulic breaker.

Technical Solution

In a hydraulic breaker provided with an automatic lubricant supply structure according to an aspect of the present invention, the automatic lubricant supply structure is disposed in a body to supply a lubricant using a working fluid, and a lubricant cartridge is detachably directly coupled to the automatic lubricant supply structure.

The automatic lubricant supply structure may include a cartridge coupler to which the lubricant cartridge is coupled and that communicates with a lubricant supply line, and the lubricant supply line may include: a working fluid line that communicates with a working fluid inlet of the body; a lubricant line configured to supply a lubricant to a chisel; and a supply valve that communicates with the working fluid line, the lubricant line, and the cartridge coupler, and supplies a lubricant in the lubricant cartridge to the chisel through the lubricant line, depending on whether a working fluid flows inside through the working fluid line.

The body may include a cylinder, a front head disposed under the cylinder, and a back head disposed over the cylinder, the cartridge coupler to which the lubricant cartridge is coupled may be disposed at the back head, and the cartridge coupler may be positioned in the same plane as the working fluid inlet of the cylinder.

The hydraulic breaker may further include a bracket coupled to the body, in which the bracket may include: a housing in which the cartridge coupler, the working fluid inlet, and the working fluid outlet of the body are accommodated; and a cover coupled to the housing and covering the cartridge coupler, the working fluid inlet, and the working fluid outlet.

The cover may have a cartridge insertion groove that communicates with a body seat hole of the cartridge coupler, an inlet connector that communicates with the working fluid inlet, and an outlet connector that communicates with the working fluid outlet.

The cartridge coupler, the working fluid inlet, and the working fluid outlet may be positioned on a rear surface of the body, and the housing may be positioned on a rear surface of the bracket to be positioned on the rear surface of the body when the bracket is coupled to the body.

The height of the housing may be larger than or the same as the protrusive heights of the cartridge coupler, the working fluid inlet, and the working fluid outlet.

Advantageous Effects

The hydraulic breaker provided with an automatic lubricant supply structure according to an aspect of the present invention described above has the following effects.

Since the automatic lubricant supply structure is operated by a working fluid, a lubricant is supplied only when the hydraulic breaker is operated. Accordingly, the problem of malfunction that a lubricant is supplied when a hydraulic breaker is not operated is solved, so an unnecessary waste of lubricant can be reduced.

Since the automatic lubricant supply structure is disposed in the body of the hydraulic breaker, it is possible to prevent the automatic lubricant supply structure from being damaged by fragments of rocks, etc. when breaking the rocks.

The structure of the body in which the automatic lubricant supply structure is disposed is simple and the space of the body is used, so it is possible to manufacture a compact hydraulic breaker.

Since there is no need for a separate hose in the lubricant supply line of the automatic lubricant supply structure, there is no need for a separate hose other than the supply hose and the discharge hose when connecting the hydraulic breaker to the hydraulic pump of an excavator. Accordingly, the hose structure is simplified, so free use of the hydraulic breaker mounted on an excavator is secured and high compatibility is secured in hydraulic connection between the excavator and the hydraulic breaker. Further, it is possible to prevent a specific hose from being damaged by rocks during breaking.

Since a lubricant is supplied by the lubricant cartridge that can be separated from the body, it is possible to simply supply a lubricant by replacing the lubricant cartridge.

MODE FOR INVENTION

The following description provides only the principle of the present invention. Accordingly, those skilled in the art may implement of the principle of the present invention and various apparatuses included in the concept and range of the present invention even though they are not explicitly described or shown herein. All conditional terminologies and embodiments described herein should be understood as being definitely intended only on the purpose of understanding the concept of the present invention without limiting the specifically stated embodiments and states.

The objectives, features, and advantages of the present invention described above will be clearer through the following detailed description relating to the accompanying drawing, so the spirit of the present invention could be easily implemented by those skilled in the art.

Hereafter, a hydraulic breaker 10 provided with an automatic lubricant supply structure 200 according to an exemplary embodiment of the present invention is described.

Figure 1:
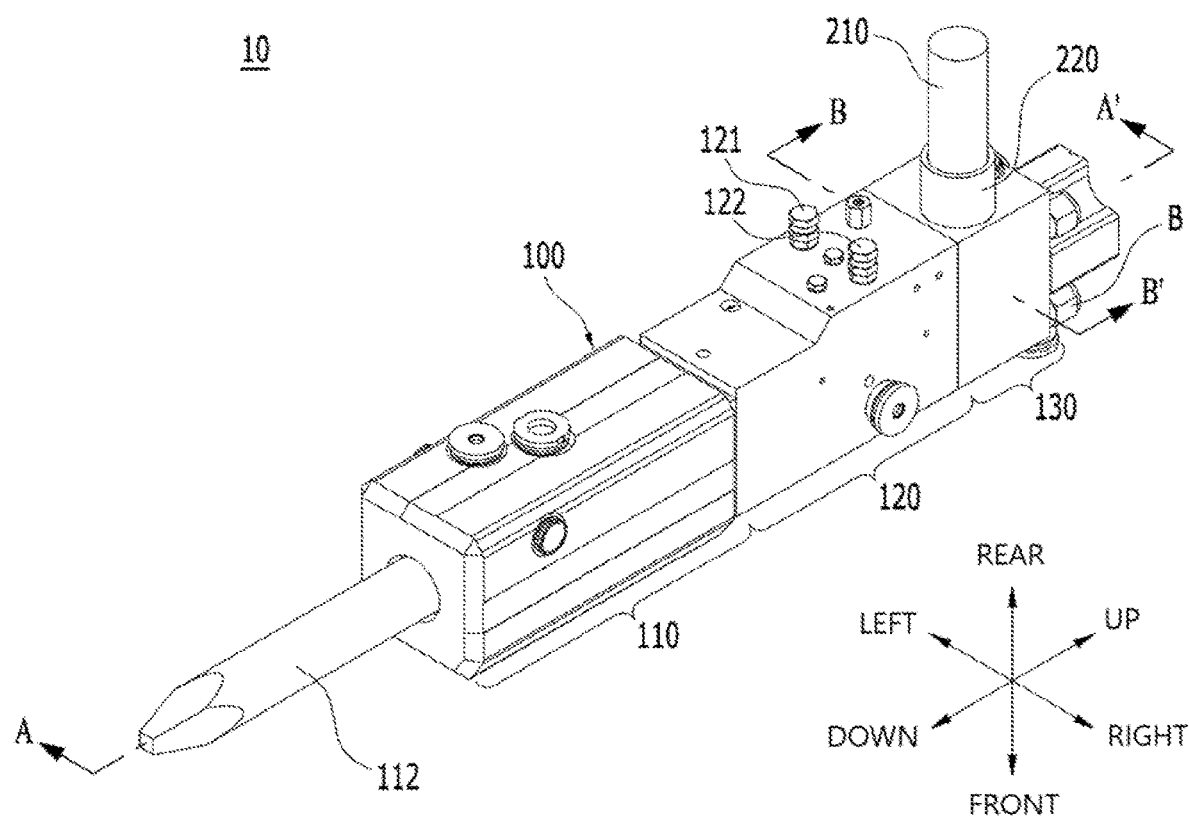
FIG. 1 is a view showing a hydraulic breaker provided with an automatic lubricant supply structure according to an exemplary embodiment of the present invention.
Figure 2:
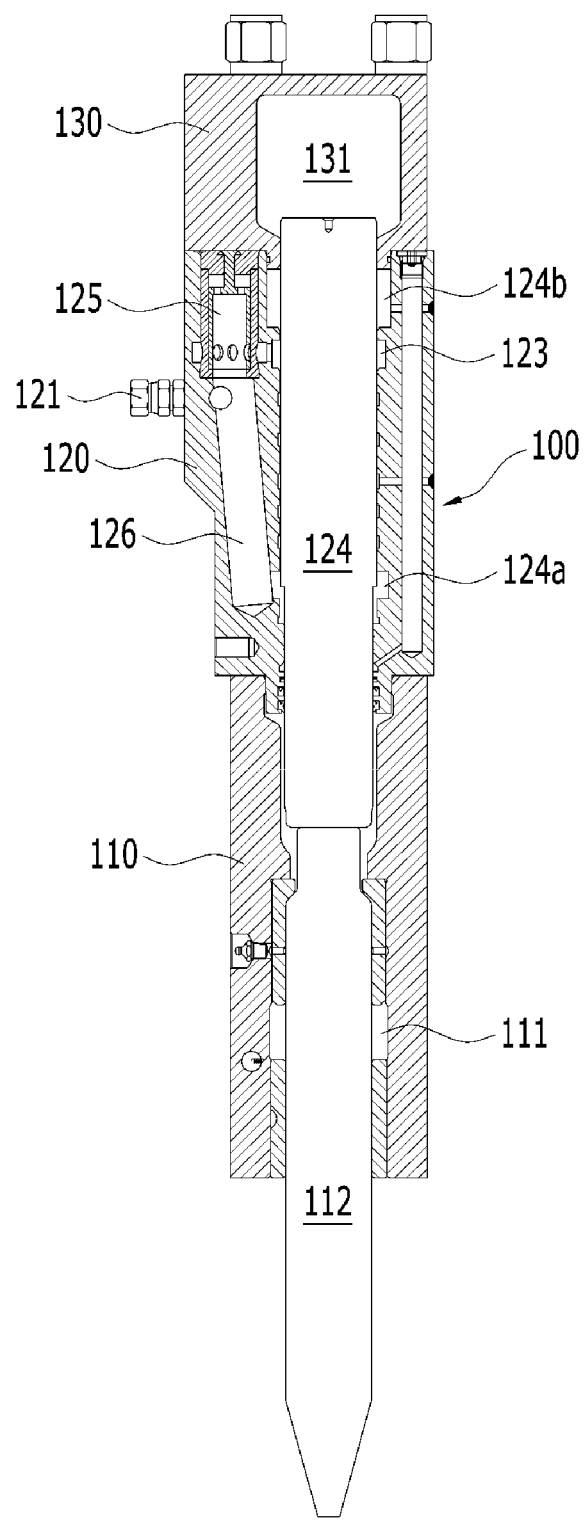
FIG. 2 is a cross-sectional view taken along line A-A' of FIG. 1.
Figure 3:
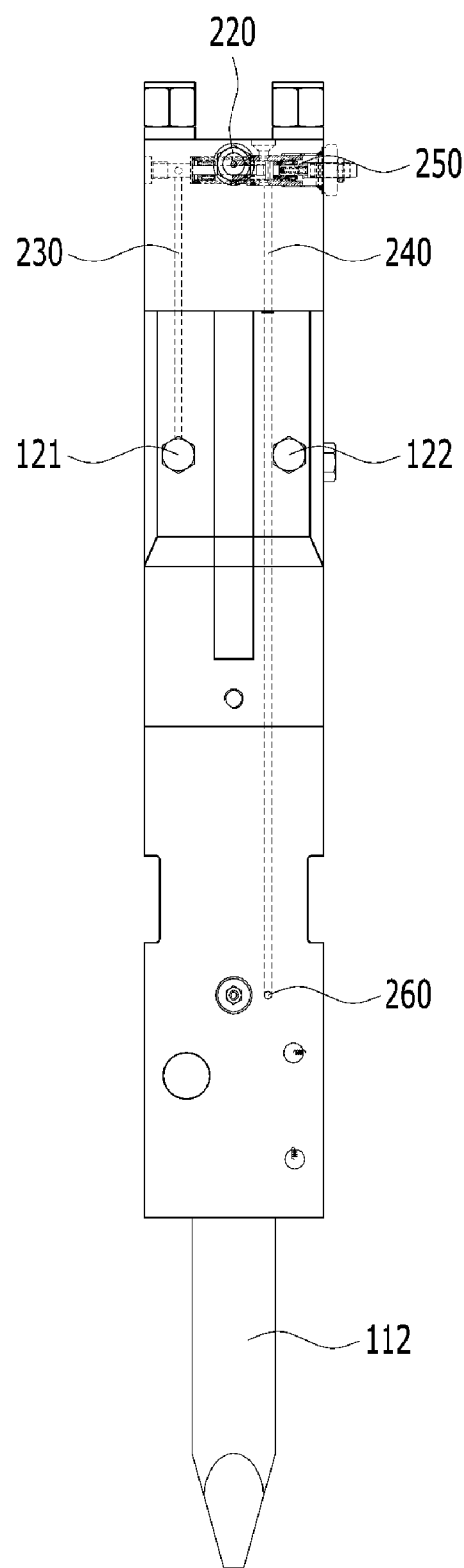
FIG. 3 is a rear view of the hydraulic breaker of FIG. 1.
Figure 4:
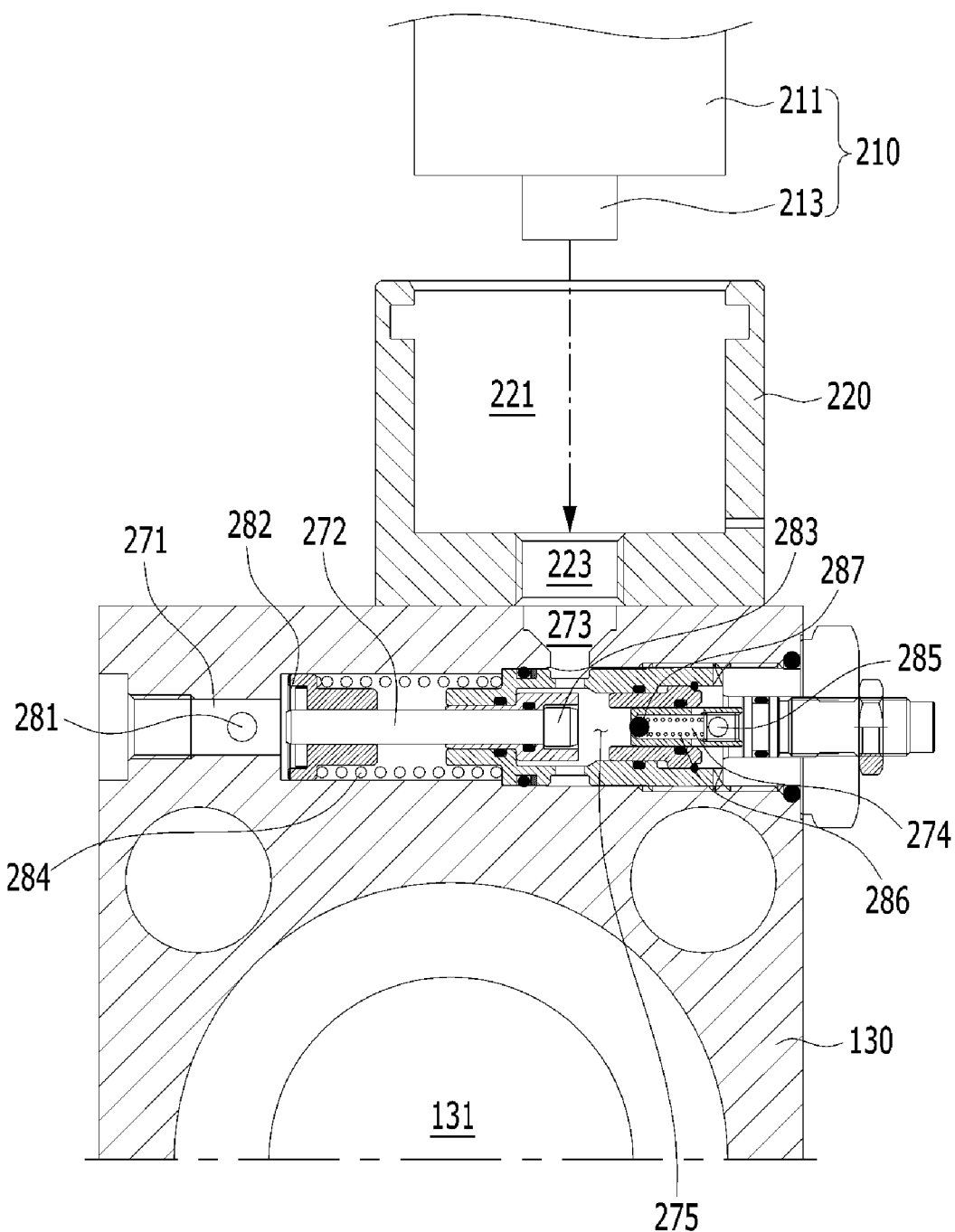
FIG. 4 is a cross-sectional view taken along line B-B' of FIG. 1.
Figure 5:
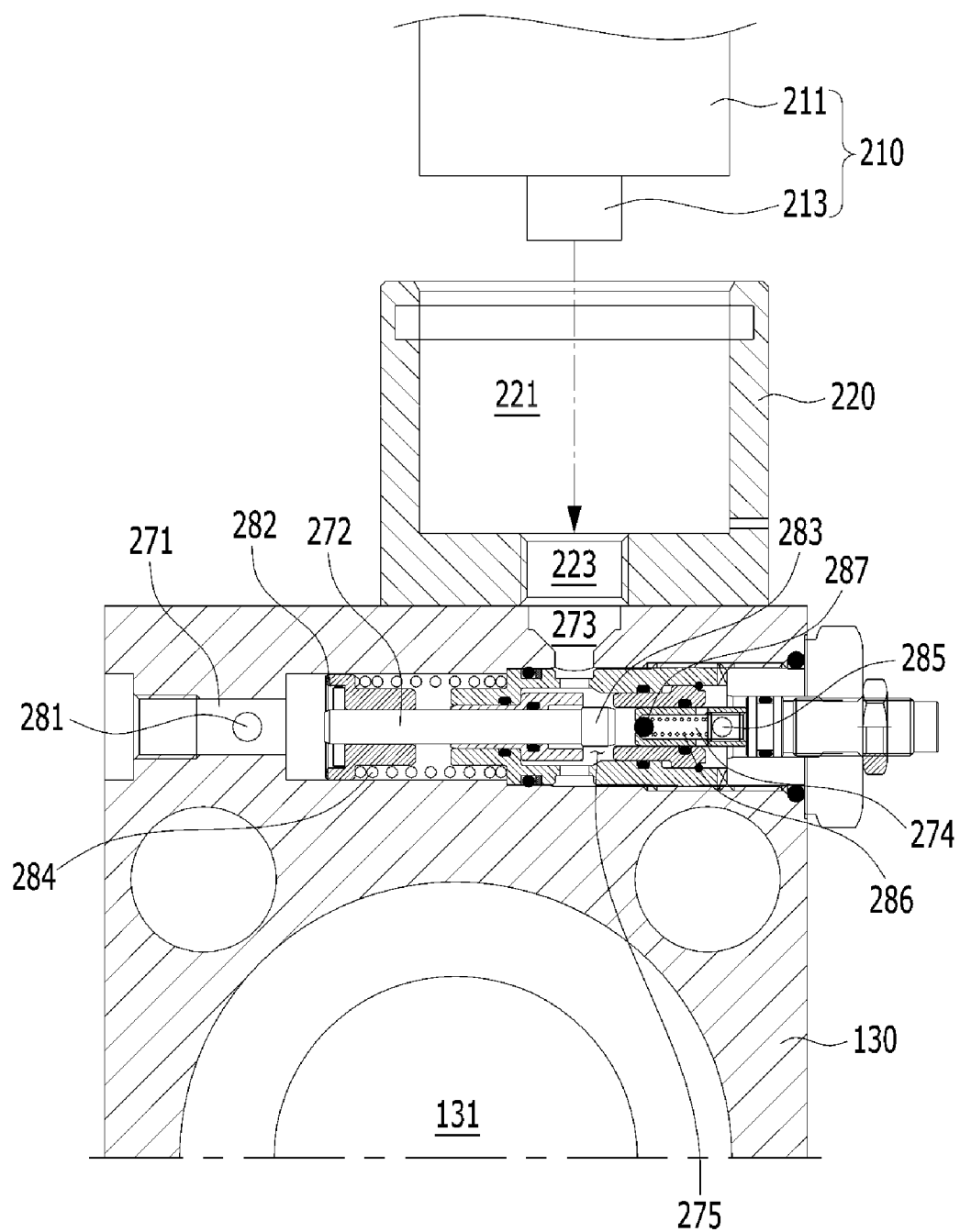
FIG. 5 is a cross-sectional view showing a pump spool that has been moved in the state of FIG. 4.
Figure 6:
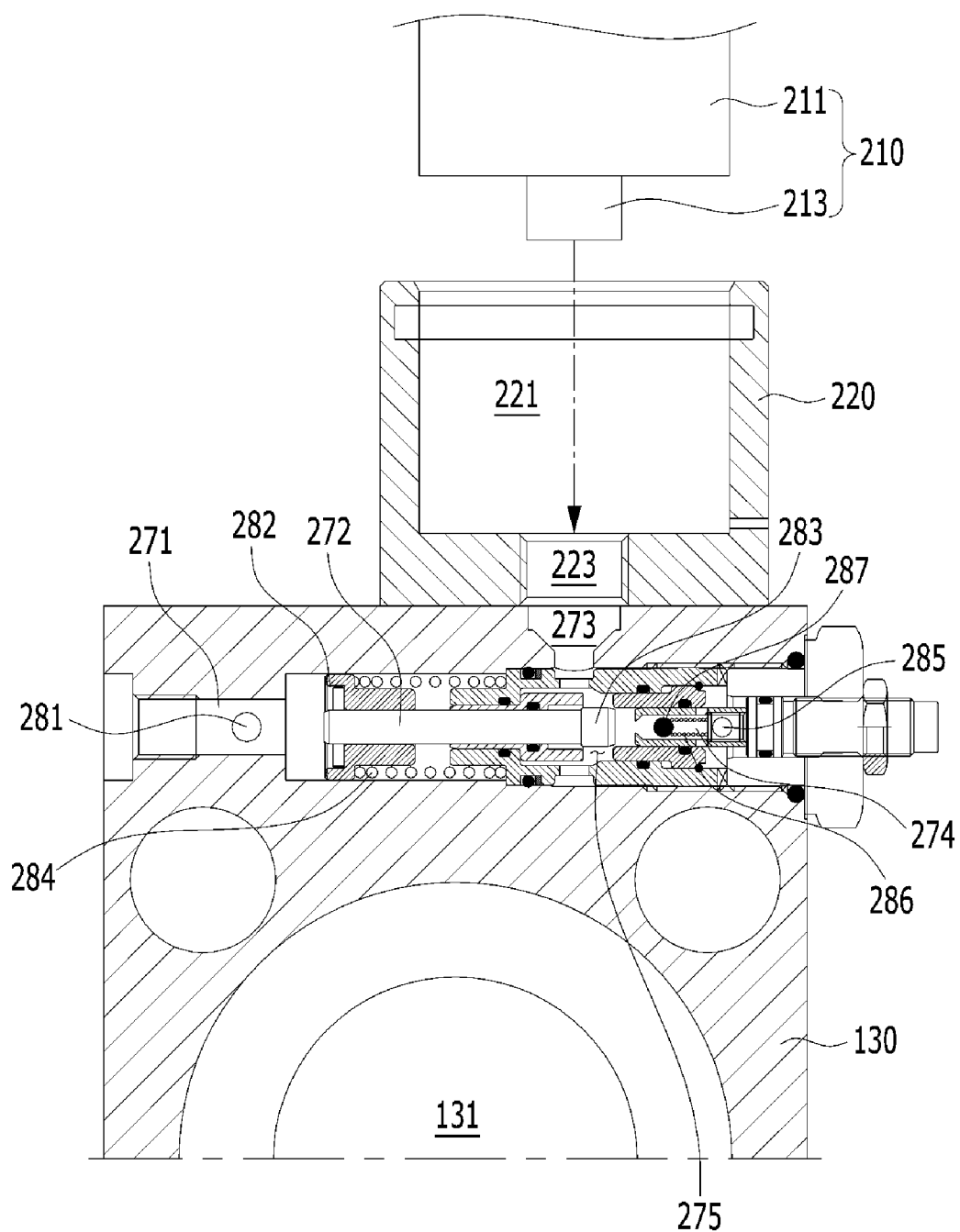
FIG. 6 is a cross-sectional view showing a check valve that has been opened in the state of FIG. 5.
Figure 7:
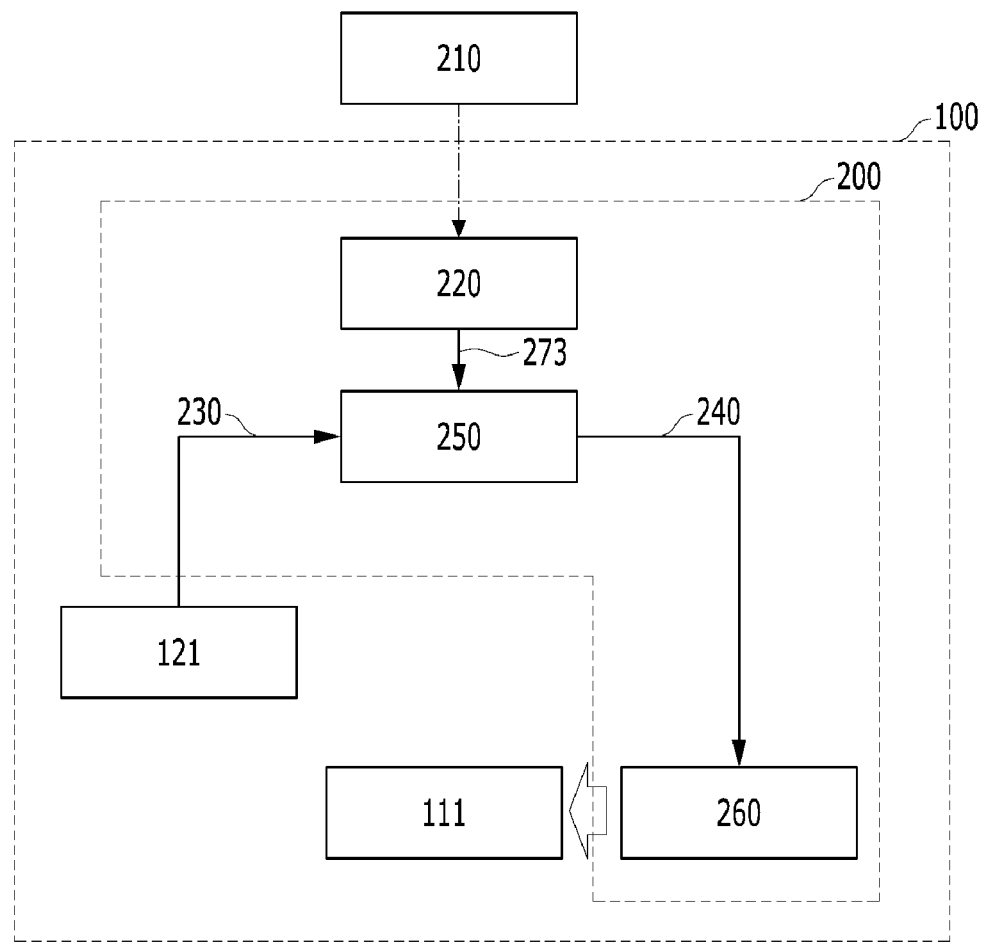
FIG. 7 is a schematic view of the automatic lubricant supply structure in the hydraulic breaker provided with an automatic lubricant supply structure according to an exemplary embodiment of the present invention.
Figure 8:
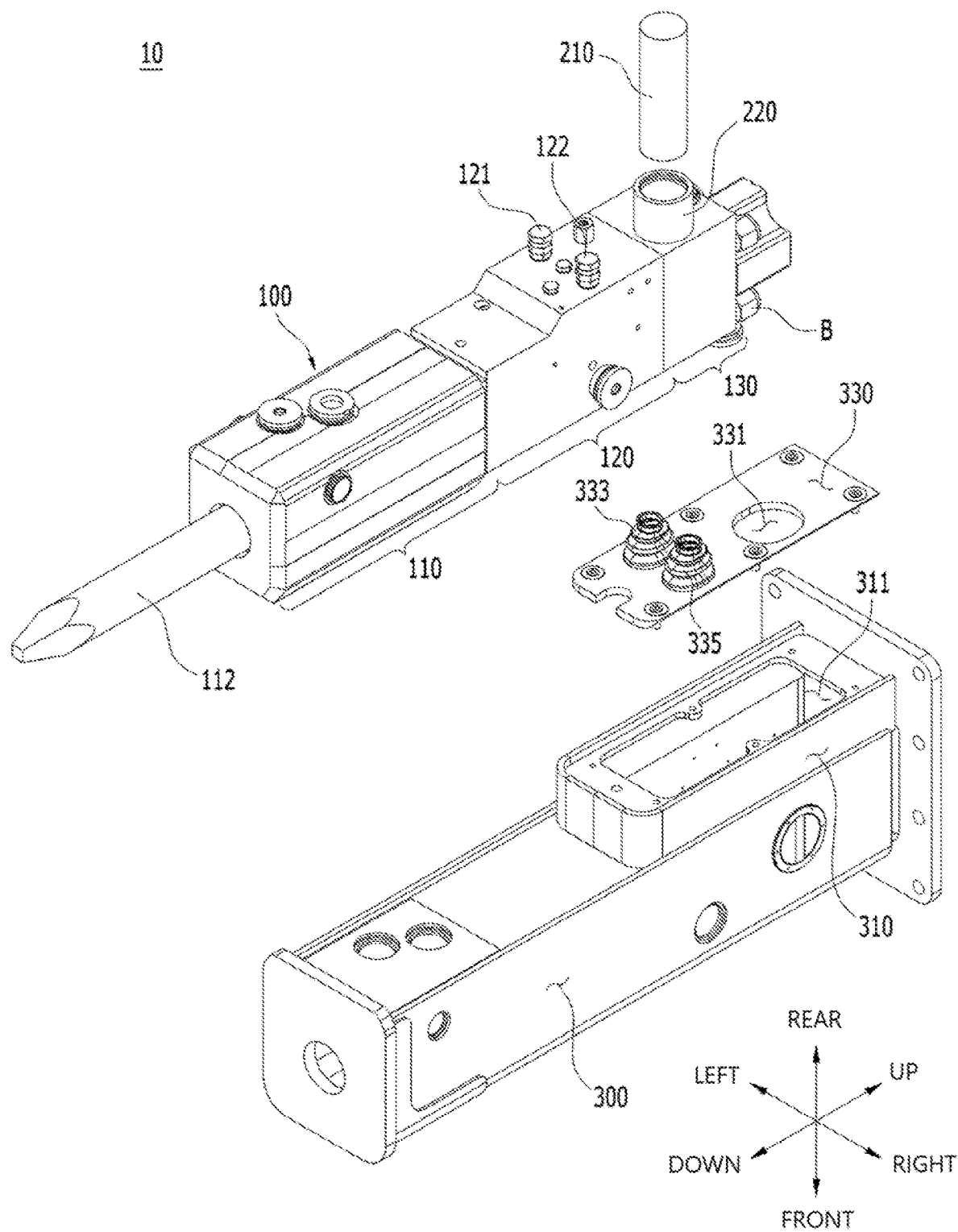
FIG. 8 is a view showing the hydraulic breaker provided with an automatic lubricant supply structure according to an exemplary embodiment of the present invention and a bracket that is coupled to the hydraulic breaker.
Figure 9:
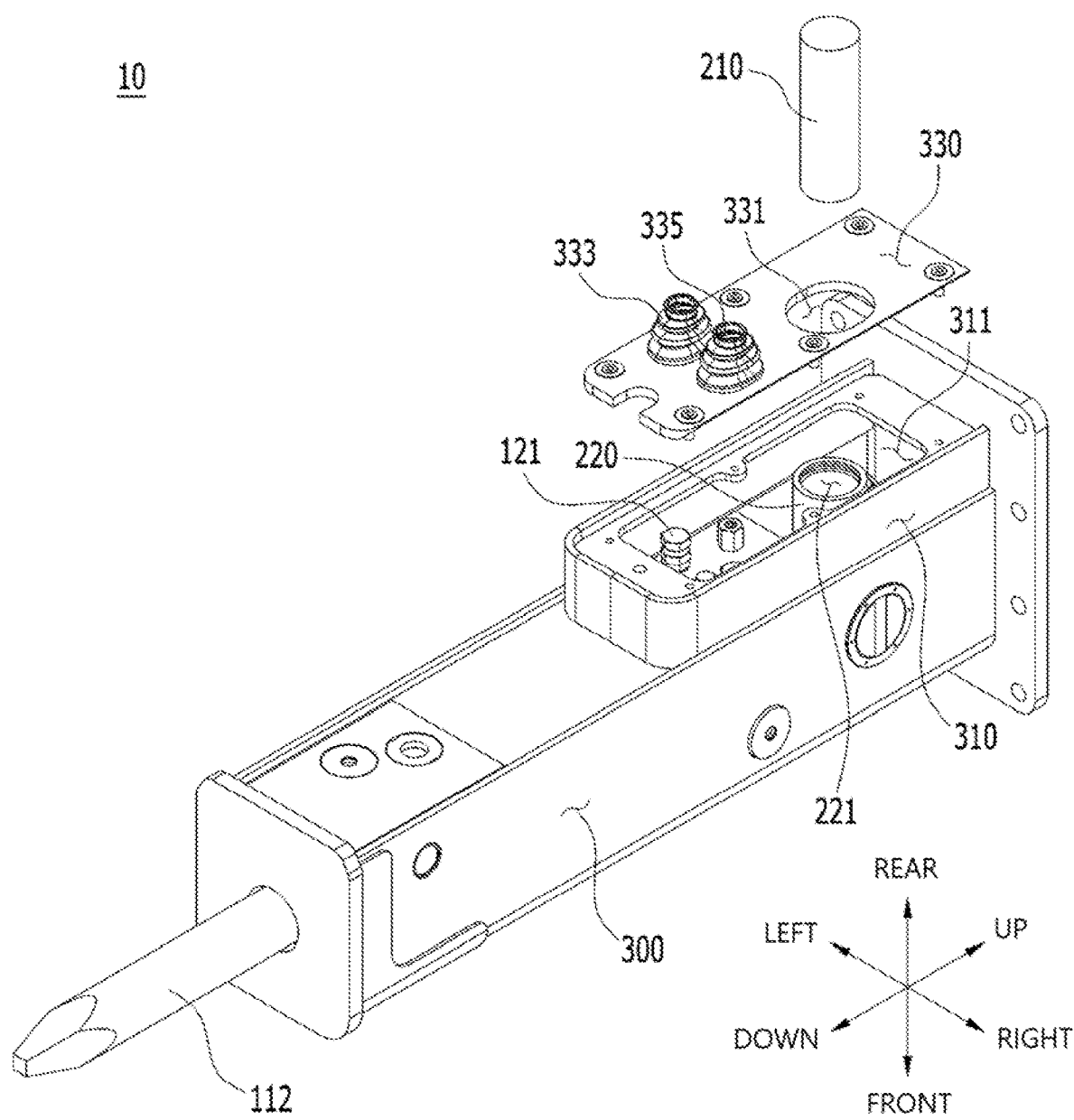
FIGS. 9 and 10 are views the assembly of the bracket of FIG. 8 and the hydraulic breaker of FIG. 8.
Figure 10:
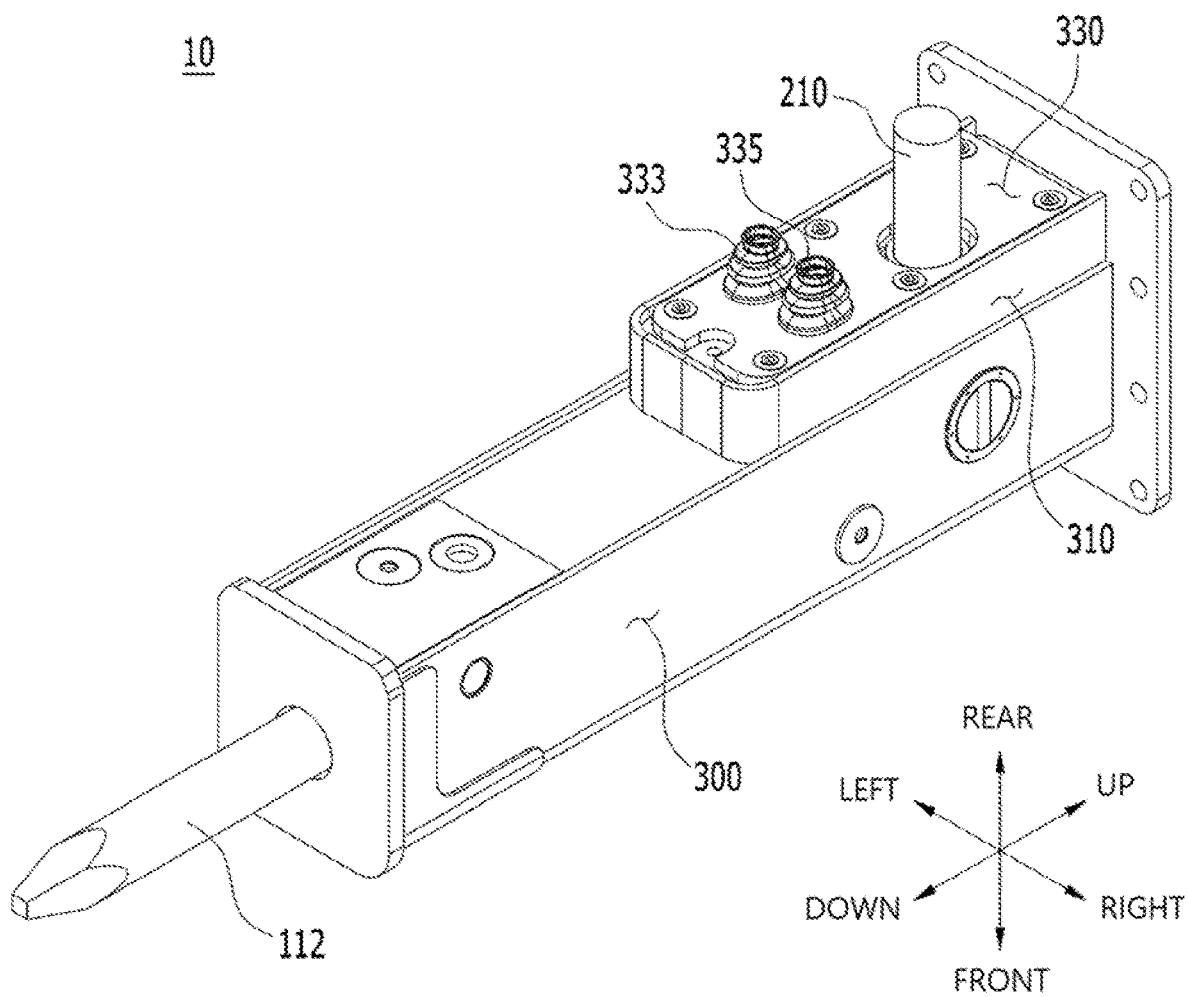

FIG. 1 is a view showing a hydraulic breaker provided with an automatic lubricant supply structure according to an exemplary embodiment of the present invention, FIG. 2 is a cross-sectional view taken along line A-A' of FIG. 1, FIG. 3 is a rear view of the hydraulic breaker of FIG. 1, FIG. 4 is a cross-sectional view taken along line B-B' of FIG. 1. FIG. 5 is a cross-sectional view showing a pump spool that has been moved in the state of FIG. 4, FIG. 6 is a cross-sectional view showing a check valve that has been opened in the state of FIG. 5, FIG. 7 is a schematic view of the automatic lubricant supply structure in the hydraulic breaker provided with an automatic lubricant supply structure according to an exemplary embodiment of the present invention, FIG. 8 is a view showing the hydraulic breaker provided with an automatic lubricant supply structure according to an exemplary embodiment of the present invention and a bracket that is coupled to the hydraulic breaker, and FIGS. 9 and 10 are views the assembly of the bracket of FIG. 8 and the hydraulic breaker of FIG. 8.

As shown in FIGS. 1 to 3, and 7, a hydraulic breaker 10 according to an exemplary embodiment of the present invention may include a body 100, a piston 124 reciprocating in the body 100, a working fluid channel 126 formed in the body 100 for a working fluid reciprocating the piston 124 to flow therethrough, a control valve 125 controlling flow of the working fluid, a chisel 112 configured to be hit by the piston 124, and an automatic lubricant supply structure 200 disposed in the body 100.

In the hydraulic breaker 10, the automatic lubricant supply structure 200 that supplies a lubricant using a working fluid is disposed in the body 100, and a lubricant cartridge 210 is detachably coupled to the automatic lubricant supply structure 200.

In other words, the lubricant cartridge 210 is detachably directly coupled to the automatic lubricant supply structure 200, without using a hose in a lubricant supply line.

The body 100 may be assembled by combining a cylinder 120, a front head 110 disposed under the cylinder 120, and a back head 130 disposed over the cylinder 120.

In other words, the front head 110, the cylinder 120, and the back head 130 are positioned upward from the bottom, and the front head 110, the cylinder 120, and the back head 130 may be fastened to one another by long bolts B.

The chisel 112 for breaking rocks is disposed in a first hollow 111 formed in the front head 110.

A working fluid inlet 121 and a working fluid outlet 122 are formed through the rear surface of the cylinder 120, and the piston 124 moving up and down in the cylinder 120 is disposed in a second hollow 123 formed in the cylinder 120.

The control valve 125 that controls the flow of a working fluid, which flows in the body 100 through the working fluid inlet 121, to a lower chamber 124*a* or an upper chamber 124*b* is disposed in the cylinder 120.

In detail, when the control valve 125 is closed and a working fluid is supplied through the working fluid inlet 121, the working fluid flows to the lower chamber 124*a* through the working fluid channel 126. On the contrary, when the control valve 125 is opened and a working fluid is supplied through the working fluid inlet 121, the working fluid flows to the upper chamber 124*b*.

When a working fluid flows to the lower chamber 124*a*, the piston 124 is moved up. When the piston 124 is moved up to the top dead center, the control valve 125 allows the working fluid to flow to the upper chamber 124*b*, whereby the piston 124 is moved down.

In other words, the piston 124 is controlled to repeatedly move up and down by the control valve 125. When the piston 124 moves down, the bottom of the piston 124 hits the top of the chisel 112, and the chisel 112 moves down and breaks the ground by the hitting force.

A gas chamber 131 connected with a hole in the cylinder 120 is formed in the back head 130 and is filled with nitrogen gas. The nitrogen gas in the gas chamber 131 serves to attenuate shock when the piston 124 reacts upward after hitting the chisel 112.

As described above, the operation of the hydraulic breaker 10 is achieved by a working fluid.

A hydraulic pump and a hydraulic tank of equipment such as an excavator are connected to the working fluid inlet 121 and the working fluid outlet 122 of the hydraulic breaker to send a working fluid into the body 100 of the hydraulic breaker 10 and discharge a working fluid from the body 100.

In this case, the hydraulic pump and the working fluid inlet 121 are connected by a supply hose and a high-pressure working fluid provided from the hydraulic pump through the supply hose flows into the working fluid inlet 121. The hydraulic tank and the working fluid outlet 122 are connected by a discharge hose and a low-pressure working fluid discharged from the working fluid outlet 122 through the discharge hose flows to the hydraulic tank.

The automatic lubricant supply structure 200, as shown in FIGS. 1, 3, and 7, includes a cartridge coupler 220 to which the lubricant cartridge 210 is coupled, and a lubricant supply line communicating with the cartridge coupler 220.

The lubricant cartridge 210 has a body 211 in which a lubricant is kept, and an injection port 213 formed on the bottom of the body 211.

Threads (not shown) may be formed on the injection port 213 and may be thread-fastened to threads (not shown) formed in a body seat hole 221 of the cartridge coupler 220.

A body seat hole 221 in which the body 211 of the lubricant cartridge 210 is seated and an injection port seat hole 223 in which the injection port 213 of the lubricant cartridge 210 is seated may be formed in the cartridge coupler 220. In this case, the body seat hole 221 and the injection port seat hole 223 may communicate with each other.

The cartridge coupler 220 may be formed on the rear surface of the back head 130, so the cartridge coupler 220 is positioned in the same plane as the working fluid inlet 121 and the working fluid outlet 122 of the cylinder 120.

The body seat hole 221 and the injection port seat hole 223 of the cartridge coupler 220 may be formed to have a depth in the direction of a plane that is perpendicular to the rear surface of the back head 130 (that is, may be formed to have a depth in the front-rear direction of the hydraulic breaker 10). Accordingly, when the body 211 of the lubricant cartridge 210 is seated in the body seat hole 221 of the cartridge coupler 220 and the injection port 213 of the lubricant cartridge 210 is thread-fastened in the injection port seat hole 223 of the cartridge coupler 220, the body 211 of the lubricant cartridge 210 protrudes rearward from the hydraulic breaker 10, like the working fluid inlet 121.

In other words, when the lubricant cartridge 210 is coupled to the cartridge coupler 220, the lubricant cartridge 210 protrudes rearward from the hydraulic breaker 10 in the same way as the working fluid inlet 121 and the working fluid outlet 122.

As shown in FIGS. 3 and 7, the lubricant supply line serves to selectively supply a lubricant to the chisel 112, depending on whether a working fluid flows inside, and may include a working fluid line 230 that communicates with the working fluid inlet 121 of the body 100, a lubricant line 240 for supplying a lubricant to the chisel 112, and a supply valve 250 that communicates with the working fluid line 230, the lubricant line 240, and the cartridge coupler 220 and supplies a lubricant in the lubricant cartridge 210 to the chisel 112 through the lubricant line 240, depending on whether a working fluid flows inside through the working fluid line 230.

The working fluid line 230 is formed through the cylinder 120 and the back head 130 and has one end that communicates with the working fluid inlet 121 and another end that communicates with the supply valve 250.

The working fluid line 230 serves to operate the supply valve 250 by supplying the working fluid, which flows into the body 100 through the working fluid inlet 121, to the supply valve 250.

The lubricant line 240 is formed through the back head 130, the cylinder 120, and the front head 110, and has one end that communicates with the supply valve 250 and another end that communicates with a lubricant injection port 260.

The lubricant line 240 function as a passage through which the lubricant supplied from the supply valve flows to the lubricant injection port 260.

The lubricant injection port 260 connects the first hollow 111 formed in the front head 110 to the lubricant line 240, and accordingly, the lubricant flowing through the lubricant line 240 can be supplied to the chisel 112 through the first hollow 111.

As shown in FIGS. 3, 4, and 7, the supply valve 250 is disposed in the back head 130 and communicates with the working fluid line 230, the lubricant line 240, and the cartridge coupler 220. The supply valve 250 serves to supply the lubricant in the lubricant cartridge 210 to the chisel 112 through the lubricant line 240, depending on whether a working fluid flows inside through the working fluid line 230.

The supply valve 250 may include a first chamber 271 that has a first hole 281 that communicates with the working fluid line 230, a pumping spool 272 that is operated by a working fluid in the first chamber 271, a lubricant inlet 273 that connects the injection port seat hole 223 and the supply valve 250, a check valve 274 that has a second hole 285 that communicates with the lubricant line 240, and a second chamber 275 that communicates with the lubricant inlet 273 and the check valve 274.

The first hole 281 that communicates with the working fluid line 230 is formed in the first chamber 271.

The first chamber 271 serves to provide a space that is filled with a working fluid when the working fluid in the working fluid line 230 flows into the first chamber 271 through the first hole 281.

The pumping spool 272 has a pressing surface 282 on a side (the left side in FIG. 4) and a protruding end on another side (the right side in FIG. 4).

If a working fluid flows into the first chamber 271 and rises in the first chamber 271, the pressing surface 282 of the pumping spool 272 is pressed by the working fluid and an end 283 of the pumping spool 272 is moved to another side (the right side in FIG. 4). The end 283 of the pumping spool 272 is positioned in the second chamber 275 in this way.

The pumping spool 272 has a pumping spool spring 284 and the pumping spool spring 284 serves to move the end 283 of the pumping spool 272 to a side (the left side in FIG. 4), that is, serves to return the pumping spool 272 to the initial position using an elastic restoring force.

Hereafter, the operation process of the automatic lubricant supply structure 200 of the hydraulic breaker 10 according to an exemplary embodiment of the present invention is described with reference to FIGS. 3 to 7.

When the hydraulic breaker 10 is started by starting a hydraulic pump of an excavator, high-pressure working fluid pumped up from the hydraulic pump flows into the body 100 of the hydraulic breaker 10 through the supply hose and the working fluid inlet 121.

As described above, some of the high-pressure working fluid flowing in the body 100 flows to the working fluid channel 126 or the control valve 125 and takes part in up/down movement of the piston 124, and the other of the high-pressure working fluid flows into the first chamber 271 through the working fluid line 230 and the first hole 281.

When high-pressure working fluid flows in the first chamber 271, the high-pressure working fluid presses the pressing surface 282 of the pumping spool 272, whereby, as shown in FIG. 5, the end 283 of the pumping spool 272 is moved to another side, that is, the right side. This is because the pressing force of the high-pressure working fluid is larger than the elastic restoring force of the pumping spool spring 284 of the pumping spool 272.

In this case, the second chamber 273 has been filled with a lubricant that has been kept in the body 211 of the lubricant cartridge 210 through the injection port 213 of the lubricant cartridge 210 and the lubricant inlet 273.

Accordingly, as shown in FIG. 5, as the end 283 of the pumping spool 272 is moved to the left side, the end 283 pushes the lubricant out of the second chamber 275 and a ball 287 of the check valve 274 is moved to another side, that is, the right side by the pressing force of the lubricant, as shown in FIG. 6, whereby the check valve 274 is opened.

As the check valve 274 is opened, the lubricant in the second chamber 275 flows to the lubricant line 240 through the second hole 285 and is injected into the first hollow 111 of the front head 110 through the lubricant injection port 260, whereby the lubricant is supplied between the chisel 112 and the inner surface of the front head 110, that is, the inner surface of the first hollow 111.

If when the operation of the hydraulic breaker 10 is stopped by stopping the operation of the hydraulic pump of the excavator, inflow of a high-pressure working fluid to the first chamber 271 is stopped, so the end 283 of the pumping spool 272 is moved left and returned to the initial position by the elastic restoring force of the pumping spool spring 284.

As the end 283 of the pumping spool 272 is returned to the initial position (the position in FIG. 4), the pressing force of the lubricant in the second chamber 275 is removed, so the ball 287 of the check valve 274 is also moved left and returned to the initial position (the position in FIGS. 4 and 5) by the elastic restoring force of the check valve spring 286, whereby the check valve 274 is closed. Therefore, supply of a lubricant through the lubricant line 240 is stopped.

The hydraulic breaker 10 provided with an automatic lubricant supply structure 200 having the configuration described above in accordance with an exemplary embodiment of the present invention has the following effects.

Since the automatic lubricant supply structure 200 is operated by a working fluid, a lubricant is supplied only when the hydraulic breaker 10 is operated. Accordingly, it is possible to solve the problem of malfunction in the hydraulic breakers of the related art that a lubricant is supplied when a hydraulic breaker is not operated, thereby being able to reduce an unnecessary waste of lubricant.

Since the automatic lubricant supply structure 200 is disposed in the body 100 of the hydraulic breaker 10, it is possible to prevent the automatic lubricant supply structure 200 from being damaged by fragments s of rocks, etc. when breaking the rocks, unlike the hydraulic breakers of the related art. The built-in structure of the body of the automatic lubricant supply structure 200 is simple and the space of the body 100 is used, so it is possible to manufacture a compact hydraulic breaker 10.

Since the automatic lubricant supply structure 200 is disposed in the body 100 of the hydraulic breaker 10, there is no need for a separate hose in the lubricant supply line, so there is no need for a separate hose other than the supply hose and the discharge hose when connecting the hydraulic breaker 10 to the hydraulic pump of an excavator. Accordingly, the hose structure is simplified, so free use of the hydraulic breaker 10 mounted on an excavator is secured and high compatibility is secured in hydraulic connection between the excavator and the hydraulic breaker 10.

Further, it is possible to prevent a separate hose from being damaged by rocks generated in breaking.

Since a lubricant is supplied by the lubricant cartridge 210 that can be separated from the body 100, it is possible to simply supply a lubricant by replacing the lubricant cartridge 210.

The hydraulic breaker 10 according to an exemplar embodiment of the present invention described above may further include a bracket 300 that is coupled to the body 100, as shown in FIGS. 8 to 10.

The bracket 300 includes: a housing 310 formed on the rear surface of the bracket 300 and accommodating the cartridge coupler 220, the working fluid inlet 121, and the working fluid outlet 122 of the body 100; and a cover 330 coupled to the housing 310 and covering the cartridge coupler 220, the working fluid inlet 121, and the working fluid outlet 122.

The housing 310 is positioned on the rear surface of the bracket 300 and a housing groove 311 is formed at the center of the housing 310.

The height of the housing 310 is larger than or the same as the protrusive heights of the cartridge coupler 220, the working fluid inlet 121, and the working fluid outlet 122.

Accordingly, as shown in FIG. 9, when the bracket 300 is coupled to the body 100, the housing 310 is positioned on the rear surface of the body 100.

Further, since the housing groove 311 is formed, the cartridge coupler 220, the working fluid inlet 121, and the working fluid outlet 122 can be easily accommodated in the housing 310.

The cover 330 is coupled to the housing 310 and serves to cover the cartridge coupler 220, the working fluid inlet 121, and the working fluid outlet 122.

The cover 330 has a cartridge insertion groove 331 that communicates with the body seat hole 221 of the cartridge coupler 220, an inlet connector 333 that communicates with the working fluid inlet 121, and an outlet connector 335 that communicates with the working fluid outlet 122.

When the cover 330 is coupled to the housing 310, the inlet connector 333 communicates with the working fluid inlet 121 and the outlet connector 335 communicates with the working fluid outlet 122. In this case, the supply hose described above is connected to the working fluid inlet 121 and the discharge hose is connected to the working fluid outlet 122.

Further, when the cover 330 is coupled to the housing 310, the lubricant cartridge 210 may be inserted by the cartridge insertion groove 331. Accordingly, even though the cover 330 is coupled, the lubricant cartridge 210 can be easily coupled to the cartridge coupler 220.

As described above, since the cartridge coupler 220 is formed on the rear surface of the body 100, that is, the rear surface of the back head 130, the housing 310 may be formed to have a position corresponding to the cylinder 120 and the back head 130 of the body 100.

Further, as described above, since the cartridge coupler 220 is positioned in the same plane as the working fluid inlet 121 and the working fluid outlet 122 of the cylinder 120, that is, is positioned on the rear surface of the body 100, the cartridge coupler 220 can be easily accommodated in the housing 310 of the bracket 300. Accordingly, when the bracket 300 is coupled to the body 100, the cartridge coupler 220, the working fluid inlet 121, and the working fluid outlet 122 are prevented from being exposed outside the hydraulic breaker 10. Therefore, it is possible to prevent damage to the cartridge coupler 220, the working fluid inlet 121, and the working fluid outlet 122.

Hereafter, various modified examples of the hydraulic breaker 10 provided with the automatic lubricant supply structure 200 according to an exemplary embodiment of the present invention are described.

Figure 11:
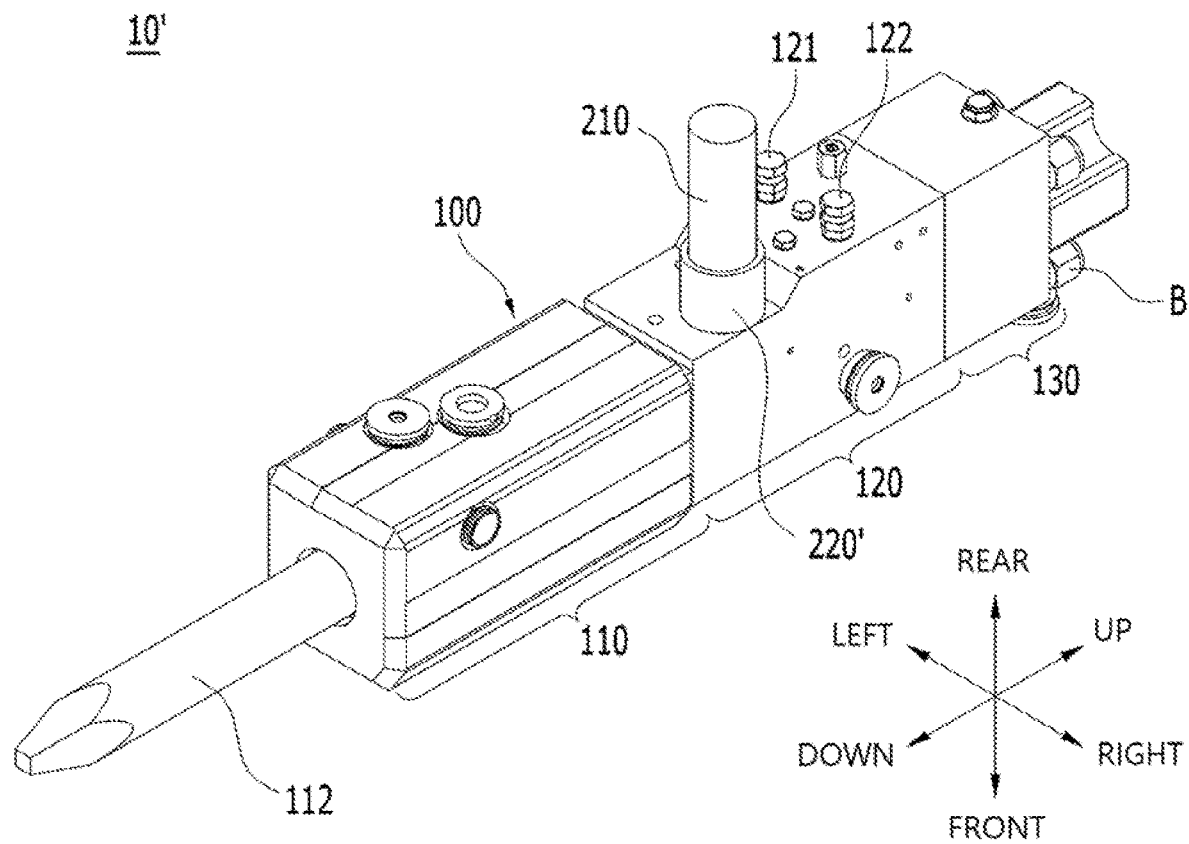
FIG. 11 is a view showing a first modified example of the hydraulic breaker provided with an automatic lubricant supply structure according to an exemplary embodiment of the present invention.
Figure 12:
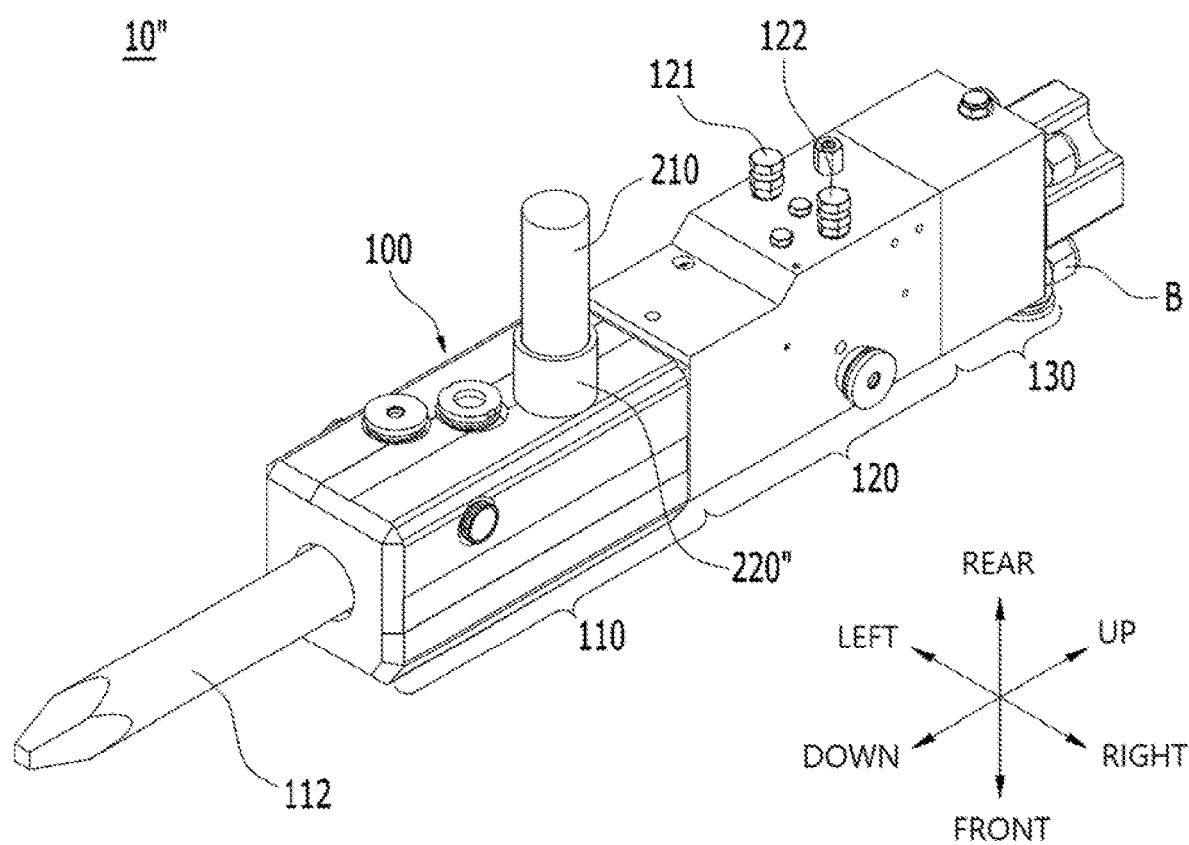
FIG. 12 is a view showing a second modified example of the hydraulic breaker provided with an automatic lubricant supply structure according to an exemplary embodiment of the present invention.

FIG. 11 is a view showing a first modified example of the hydraulic breaker provided with an automatic lubricant supply structure according to an exemplary embodiment of the present invention and FIG. 12 is a view showing a second modified example of the hydraulic breaker provided with an automatic lubricant supply structure according to an exemplary embodiment of the present invention.

Although the cartridge coupler 220 of the automatic lubricant supply structure 200 is disposed at the back head 130 in the description of the hydraulic breaker 10 provided with the automatic lubricant supply structure 200 according to an exemplary embodiment of the present invention, a cartridge coupler 220' may be disposed at the cylinder 120, as shown in FIG. 11, or a cartridge coupler 220" may be disposed at the front head 110, as shown in FIG. 12.

A hydraulic breaker 10' according to a first modified example shown in FIG. 11 has a cartridge coupler 220' at the cylinder 120. In this case, a working fluid line of the automatic lubricant supply structure may be formed in the cylinder 120 and a lubricant line may be formed through the cylinder 120 and the front head 110. Further, a supply valve may be disposed in the cylinder 120.

A hydraulic breaker 10" according to a second modified example shown in FIG. 12 has a cartridge coupler 220" at the front head 110. In this case, a working fluid line of the automatic lubricant supply structure may be formed through the cylinder 120 and the front head 110, and a lubricant line may be formed in the front head 110. Further, a supply valve may be disposed in the front head 110.

Although the cartridge couplers 220, 220', and 220" are positioned only on the rear surface of the body 100 in the description of the embodiment and modified examples, the cartridge couplers 220, 220', and 220" may be positioned on the front surface, the right surface, the left surface, the upper surface, and the lower surface, depending on the design, the use, etc. of the hydraulic breakers 10, 10', and 10".

Although the present invention was described through preferred embodiments, those skilled in the art may change or modify the present invention in various ways within a range not departing from the spirit and scope of the present invention described in the following claims.

<Description of the Reference Numerals in the Drawings>

10, 10', 10": hydraulic breaker
100: body
110: front head
111: first hole
112: chisel
120: cylinder
121: working fluid inlet
122: working fluid outlet
123: second hole
124: piston
124a: lower chamber
124b: upper chamber
125: control valve
126: working fluid channel
130: back head
131: gas chamber
200: automatic lubricant supply structure
210: lubricant cartridge
211: body
213: injection port
220: cartridge coupler
221: body seat hole
223: injection port seat hole
230: working fluid line <Description of the Reference Numerals in the Drawings>

240: lubricant line
250: supply valve
260: lubricant injection port
271: first chamber
272: pumping spool
273: lubricant inlet
274: check valve
275: second chamber
281: first hole
282: pressing surface
283: end
284: pumping spool spring
285: second hole
286: check valve spring
287: ball
300: bracket
310: housing
311: housing groove
330: cover
331: cartridge insertion groove
333: inlet connector
335: outlet connector

The invention claimed is:

1. A hydraulic breaker comprising:
a bracket;
a body coupled to an inside of the bracket;
a piston provided in the body and reciprocating by a working fluid;
a chisel provided in the body and configured to be hit by the piston;
a cartridge coupler disposed in the body and to which a lubricant cartridge is detachably directly coupled; and
an automatic lubricant supply structure disposed in the body to supply a lubricant of the lubricant cartridge using the working fluid,
wherein the body includes a cylinder, a front head disposed under the cylinder, and a back head disposed over the cylinder,
wherein the automatic lubricant supply structure includes:
a working fluid line disposed in the body and that communicates with a working fluid inlet of the body;
a lubricant line disposed in the body and configured to supply the lubricant to a lubricant injection port; and
a supply valve disposed in the body, that communicates with the working fluid line, the lubricant line, and the cartridge coupler, and supplies the lubricant to the lubricant injection port through the lubricant line, depending on a pressure of the working fluid which flows inside through the working fluid line,
wherein the working fluid line is formed through the cylinder and the back head, and has one end that communicates with the working fluid inlet and another end that communicates with the supply valve,
wherein the working fluid line serves to operate the supply valve by supplying the working fluid, which flows into the body through the working fluid inlet, to the supply valve,
wherein the lubricant line is formed through the back head, the cylinder, and the front head, and has one end that communicates with the supply valve and another end that communicates with the lubricant injection port,
wherein the lubricant line functions as a passage through which the lubricant supplied from the supply valve flows to the lubricant injection port,
wherein the supply valve includes:
a first chamber having a first hole that communicates with the working fluid line and filled with the working fluid through the first hole;
a second chamber communicating with a lubricant inlet and filled with the lubricant of the lubricant cartridge through the lubricant inlet;
a pumping spool provided between the first chamber and the second chamber and moved in one direction by the pressure of the filled working fluid in the first chamber so that the pumping spool pushes the filled lubricant in the second chamber; and
a check valve provided on one side of the second chamber and having a second hole that communicates with the lubricant line, and
wherein the second chamber is provided between the pumping spool and the check valve, and the check valve is opened by a pressure of the filled lubricant in the second chamber.

2. The hydraulic breaker of claim 1,
wherein the cartridge coupler is disposed at the back head, and
wherein the cartridge coupler is positioned in the same plane as the working fluid inlet of the cylinder.

3. The hydraulic breaker of claim 1,
wherein the bracket includes:
a housing in which the cartridge coupler, the working fluid inlet, and a working fluid outlet of the body are accommodated; and
a cover coupled to the housing and covering the cartridge coupler, the working fluid inlet, and the working fluid outlet.

4. The hydraulic breaker of claim 3, wherein the cover has a cartridge insertion groove that communicates with a body seat hole of the cartridge coupler, an inlet connector that communicates with the working fluid inlet, and an outlet connector that communicates with the working fluid outlet.

5. The hydraulic breaker of claim 3, wherein the cartridge coupler, the working fluid inlet, and the working fluid outlet are positioned on a rear surface of the body, and the housing is positioned on a rear surface of the bracket to be positioned on the rear surface of the body when the bracket is coupled to the body.

6. The hydraulic breaker of claim 5, wherein a height of the housing is larger than or the same as protrusive heights of the cartridge coupler, the working fluid inlet, and the working fluid outlet.

7. A hydraulic breaker comprising:
a body;
a bracket coupled to the body;
a piston provided in the body and reciprocating by a working fluid;
a chisel provided in the body and configured to be hit by the piston;
a cartridge coupler disposed in the body and to which a lubricant cartridge is detachably directly coupled; and
an automatic lubricant supply structure disposed in the body to supply a lubricant of the lubricant cartridge using the working fluid,
wherein the automatic lubricant supply structure includes:
a working fluid line disposed in the body and that communicates with a working fluid inlet of the body;
a lubricant line disposed in the body and configured to supply the lubricant to a lubricant injection port; and
a supply valve disposed in the body, that communicates with the working fluid line, the lubricant line, and the cartridge coupler, and supplies the lubricant to the lubricant injection port through the lubricant line, depending on a pressure of the working fluid which flows inside through the working fluid line, wherein the supply valve includes:

a first chamber having a first hole that communicates with the working fluid line and filled with the working fluid through the first hole;

a second chamber communicating with a lubricant inlet and filled with the lubricant of the lubricant cartridge through the lubricant inlet;

a pumping spool provided between the first chamber and the second chamber and moved in one direction by the pressure of the filled working fluid in the first chamber so that the pumping spool pushes the filled lubricant in the second chamber; and a check valve provided on one side of the second chamber and having a second hole that communicates with the lubricant line, and wherein the second chamber is provided between the pumping spool and the check valve, and the check valve is opened by a pressure of the filled lubricant in the second chamber, wherein the bracket includes:

a housing in which the cartridge coupler, the working fluid inlet, and a working fluid outlet of the body are accommodated; and a cover coupled to the housing and covering the cartridge coupler, the working fluid inlet, and the working fluid outlet, and wherein the cover has a cartridge insertion groove that communicates with a body seat hole of the cartridge coupler, an inlet connector that communicates with the working fluid inlet, and an outlet connector that communicates with the working fluid outlet.

* * * * *